US012717539B2

(12) United States Patent
Chen et al.

(10) Patent No.: US 12,717,539 B2
(45) Date of Patent: Aug. 25, 2026

(54) METHOD AND ELECTRONIC DEVICE FOR HANDLING DISPLAY CONTROL

(71) Applicant: MEDIATEK INC., Hsin-Chu (TW)

(72) Inventors: Tsung-Hsin Chen, Hsinchu City (TW); Chin-Wen Liang, Hsinchu City (TW); Wei-Chen Lin, Hsinchu City (TW); Tung-Hung Lin, Hsinchu City (TW); Shih-Yu Huang, Hsinchu City (TW); Chen-Wei Yu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/814,575

(22) Filed: Aug. 25, 2024

(65) Prior Publication Data

US 2025/0123792 A1 Apr. 17, 2025

Related U.S. Application Data

(60) Provisional application No. 63/543,917, filed on Oct. 12, 2023.

(51) Int. Cl.
*G06F 3/147* (2006.01)
*G09G 3/34* (2006.01)

(52) U.S. Cl.
CPC ........... *G06F 3/147* (2013.01); *G09G 3/3406* (2013.01); *G09G 2320/0626* (2013.01); *G09G 2330/021* (2013.01); *G09G 2340/0435* (2013.01); *G09G 2354/00* (2013.01)

(58) Field of Classification Search
CPC ...... G06F 1/1616; G06F 3/147; G06F 1/3265; G06F 1/1677; G06F 1/1641; H04M 1/0214; H04M 1/0245; H04M 1/0243; H04M 2250/16
See application file for complete search history.

(56) References Cited

U.S. PATENT DOCUMENTS

| | | | | |
|---|---|---|---|---|
| 6,487,669 B1 * | 11/2002 | Waring | G09G 5/393 | 713/324 |
| 8,659,563 B2 * | 2/2014 | Li | G06F 3/0488 | 345/173 |
| 2003/0103041 A1 * | 6/2003 | Nguyen | G06F 1/1624 | 345/168 |
| 2008/0309652 A1 * | 12/2008 | Ostlund | G09G 5/363 | 345/211 |
| 2011/0242361 A1 * | 10/2011 | Kuwahara | G06F 1/1647 | 348/231.4 |
| 2012/0299977 A1 * | 11/2012 | Chen | G09G 3/3406 | 345/102 |
| 2018/0203500 A1 * | 7/2018 | Kim | G06F 1/3287 | |
| 2018/0293761 A1 * | 10/2018 | Ceylan | G06T 15/005 | |
| 2022/0319388 A1 * | 10/2022 | Xian | G06F 3/1438 | |

FOREIGN PATENT DOCUMENTS

| | | |
|---|---|---|
| CN | 113010257 A | 6/2021 |
| CN | 114816607 A | 7/2022 |

* cited by examiner

*Primary Examiner* — Koosha Sharifi-Tafreshi
(74) *Attorney, Agent, or Firm* — Winston Hsu

(57) ABSTRACT

A method for handling a display control of a microprocessor in an electronic device includes: receiving a display trigger signal; and controlling a panel device in the electronic device to display a content, in response to the display trigger signal; wherein a central processing unit (CPU) in the electronic device is in a power off state, when controlling the panel device to display the content.

16 Claims, 7 Drawing Sheets

METHOD AND ELECTRONIC DEVICE FOR HANDLING DISPLAY CONTROL

CROSS REFERENCE TO RELATED APPLICATIONS

This application claims the benefit of U.S. Provisional Application No. 63/543,917, filed on Oct. 12, 2023. The content of the application is incorporated herein by reference.

BACKGROUND

A central processing unit (CPU) is a main processor in an electronic device. The CPU in the electronic device and a system executed on the CPU enter a power-saving mode (e.g., the CPU is powered off and the system enters a suspend mode) after idling for a period. A method of leaving the power-saving mode is to wake up (or resume) the CPU and the system through a wake up signal. After waking up the CPU and the system, the CPU and the system update system data and control the panel device in the electronic device to display specific content, which increases power consumption. Thus, how to improve the power consumption of the electronic device is an important problem to be solved.

SUMMARY

One of the objectives of the claimed disclosure is to provide a method and an electronic device for handling a display control.

A method for handling a display control of a microprocessor in an electronic device comprises: receiving a display trigger signal; and controlling a panel device in the electronic device to display a content, in response to the display trigger signal.

An electronic device for handling a display control comprises: a central processing unit (CPU); a panel device; and a microprocessor, arranged to receive a display trigger signal; and control the panel device to display a content, in response to the display trigger signal.

These and other objectives of the present disclosure will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
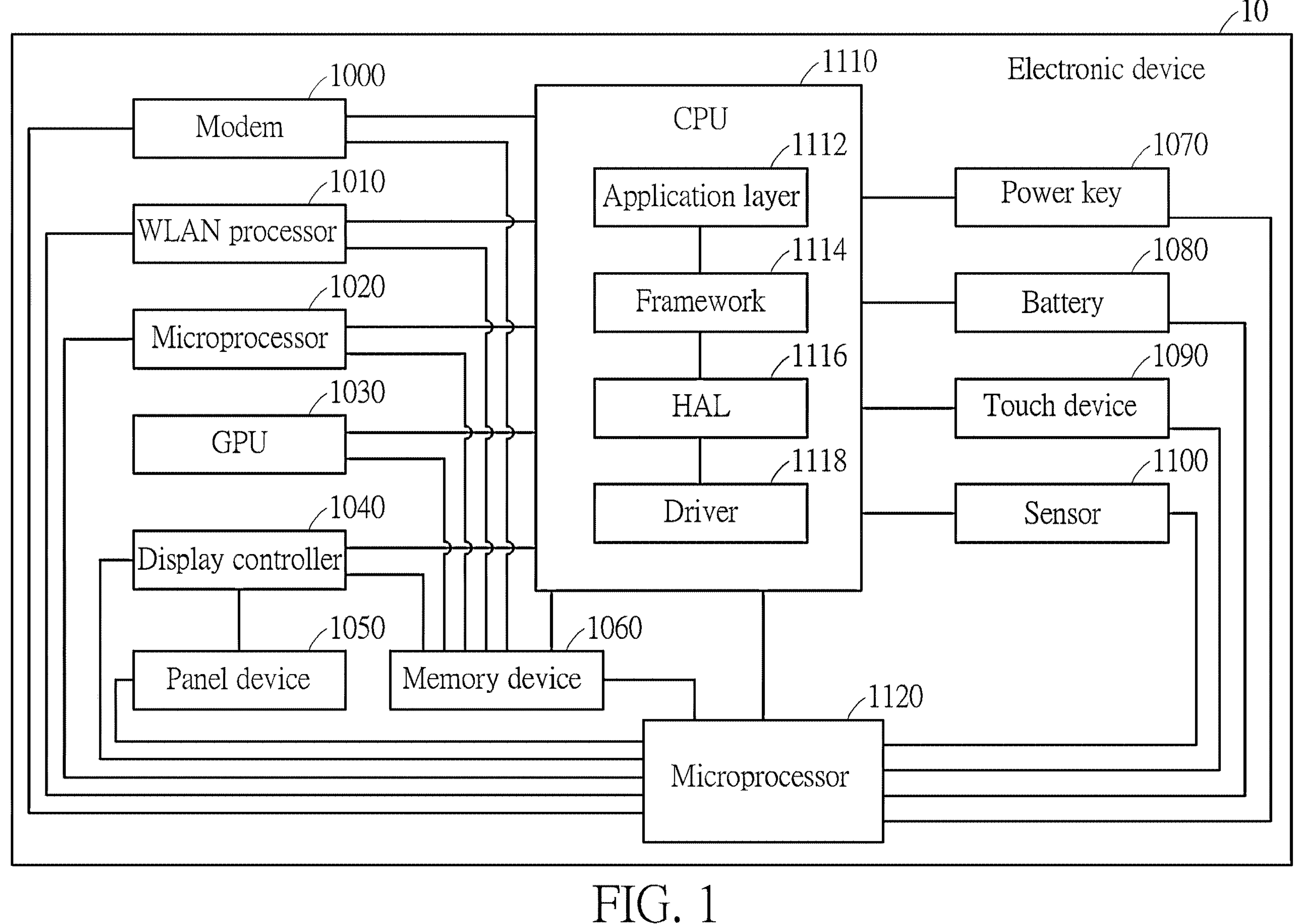
FIG. 1 is a schematic diagram of an electronic device according to an example of the present disclosure.

FIG. 1 is a schematic diagram of an electronic device 10 according to an example of the present disclosure. In FIG. 1, each line between two blocks represents a connection between the two blocks implemented via hardware, software, firmware, or combination thereof. The electronic device 10 may comprise a modem 1000, a wireless local area network (WLAN) processor 1010, microprocessors 1020 and 1120, a graphics processing unit (GPU) 1030, a display controller 1040, a panel device 1050, a memory device 1060, a power key 1070, a battery 1080, a touch device 1090 and a central processing unit (CPU) 1110. The electronic device 10 may further comprise a sensor 1100. The modem 1000 may be arranged to modulate and demodulate signals to enable digital data communication between devices. It converts digital data into analog signals for transmission over various communication mediums such as telephone lines, optical fibers, or wireless networks. It also demodulates the analog signals back into digital data. The WLAN processor 1010 may be arranged to handle WLAN communication operations for the electronic device 10. The WLAN communication operations may be Wi-Fi communication operations, but are not limited herein. The microprocessor 1020 may be arranged to perform arithmetic operations and logical operations to assist the CPU 1110 and/or co-work with the CPU 1110. The microprocessor 1120 may be a low-power microprocessor arranged to perform arithmetic operations and logical operations. The microprocessor 1120 may be a Microprocessor without Interlocked Pipeline Stages (MIPS), a Reduced Instruction Set Computer (RISC) or a Digital Signal Processor (DSP), but is not limited herein.

The GPU 1030 may be a processor arranged to process graphs and images, and then the processed graphs and images are displayed by the panel device 1050 or stored in the memory device 1060. The display controller 1040 may be arranged to control the panel device 1050 (e.g., a backlight of the panel device 1050). The panel device 1050 may be arranged to display the content. The content may comprise character(s), graph(s), image(s) and/or picture(s), but is not limited herein. The memory device 1060 may be arranged to store data (e.g., the content displayed by the panel device 1050). The memory device 1060 may be a dynamic random access memory (DRAM), but is not limited herein. The power key 1070 may be arranged to power on or power off the electronic device 10, power on or power off the panel device 1050, lock or unlock the panel device 1050, restart the electronic device 10, notify the electronic device 10 to enter into sleep mode, etc., depending on the configuration of the electronic device 10. The power state may be a powered-on state or a power-off state. The battery 1080 may be arranged to provide power to the electronic device 10. The touch device 1090 may be a sensor (or a detector) arranged to sense (or detect) at least one tap applied on it. For example, the electronic device 10 can sense a user's at least one tap through the touch device 1090. The CPU 1110 may be a processor, and is a core component responsible for controlling and executing the operations of the electronic device 10. It carries out tasks such as executing program instructions, processing data, and managing system resources. The functions of the CPU 1110 include fetching, decoding, and executing instructions, performing arithmetic and logic operations, as well as coordinating the operations of other hardware components of the electronic device 10. The CPU 1110 may be an ARM Cortex-A78, but is not limited herein. The sensor 1100 may be any kind of sensor, such as, an accelerometer, a gyroscope, an optical sensor, a temperature sensor, etc., arranged to sense a specific parameter. In an embodiment, the sensor 1100 may be an accelerometer or gyroscope, or a combination thereof, and can detect an angle change of the electronic device 10.

An application layer 1112, a framework 1114, a hardware abstraction layer (HAL) 1116 and a driver 1118 may execute on the CPU 1110. The application layer 1112 may consist of applications running on the electronic device 10. The framework 1114 may be arranged to provide application programming interface (API) warehouses to an upper layer (e.g., the application layer 1112). The HAL 1116 may be a layer where upper layer applications shield underlying hardware operations. The driver 1118 may be arranged to manage processes of the CPU 1110. The driver 1118 may be a Linux Kernel, but is not limited herein.

In FIG. 1, the electronic device 10 may operate according to a system (not shown in FIG. 1) executed on the CPU 1110. The system may be a software system such as Linux, but is not limited herein. The microprocessor 1120 may be independent of the system and the CPU 1110. That is, the microprocessor 1120 may wake up to operate (e.g., there are tasks running on the microprocessor 1120), when the CPU 1110 is powered off or powered on. The electronic device 10 may comprise a system on chip (SoC) hardware (not shown in FIG. 1), and the SoC hardware may comprise at least one of the modem 1000, the WLAN processor 1010, the microprocessors 1020 and 1120, the GPU 1030, the display controller 1040, the CPU 1110 and the memory device 1060. The electronic device 10 may be a mobile phone, a laptop, a tablet computer or a smart watch, but is not limited herein. In some examples, the modem 1000, the WLAN processor 1010 and the memory device 1060 may be located outside the SOC that the CPU 1110 and the microprocessor 1120 are located.

Figure 2:
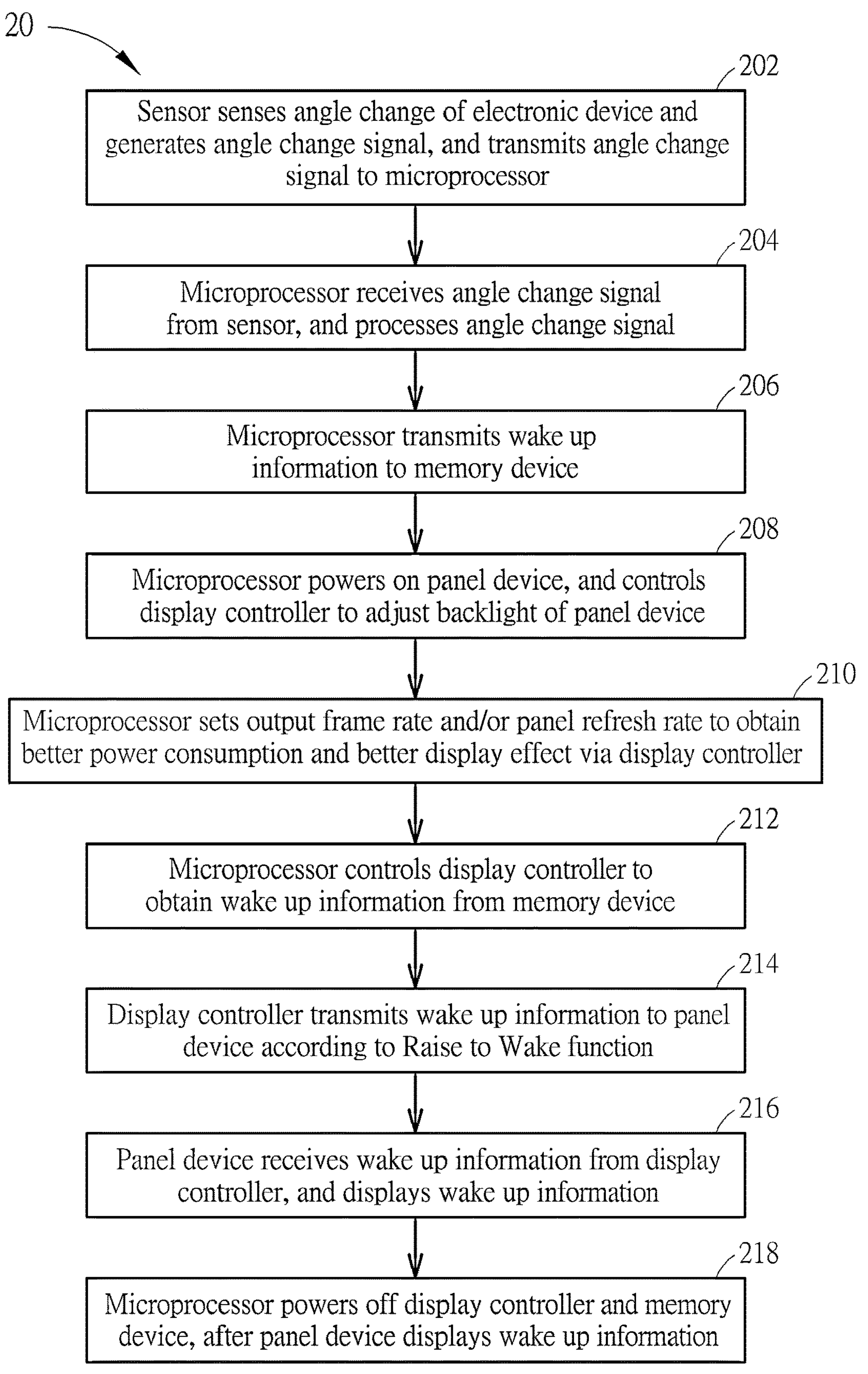
FIG. 2 is a flowchart of a process according to an example of the present disclosure.

Please refer to FIG. 2 in conjunction with FIG. 1. FIG. 2 is a flowchart of a process 20 according to an example of the present disclosure. At step 202, the sensor 1100 senses an angle change of the electronic device 10 and generates an angle change signal (or receives an angle change signal), and transmits (or sends) the angle change signal to the microprocessor 1120. The angle change signal indicates the angle change of the electronic device 10. At step 204, the microprocessor 1120 receives the angle change signal from the sensor 1100, and processes the angle change signal (e.g., via an external interrupt (EINT) function). In one example, the angle change signal wakes up the microprocessor 1120, if the microprocessor 1120 is asleep (e.g., the microprocessor 1120 is powered off or in a sleep mode). Then, the microprocessor 1120 processes the angle change signal. In one example, the microprocessor 1120 directly receives and processes the angle change signal, if the microprocessor 1120 is awake (e.g., the microprocessor 1120 is in an active mode or in an idle mode).

At step 206, the microprocessor 1120 transmits (or outputs) a wake up information (e.g., a wake up interface) to the memory device 1060. In some examples, at step 206, the microprocessor 1120 powers on the memory device 1060 before transmitting (or outputting) a wake up information (e.g., a wake up interface) to the memory device 1060 if the memory device 1060 is not powered on. The wake up information corresponds to the angle change signal, and the wake up information is the content to be displayed on the panel device 1050. At step 208, the microprocessor 1120 (e.g., a display driver in the microprocessor 1120) powers on the panel device 1050, and controls the display controller 1040 to adjust a backlight of the panel device 1050. At step 210, the microprocessor 1120 sets an output frame rate and/or a panel refresh rate to obtain a better power consumption and a better display effect via the display controller 1040. At step 212, the microprocessor 1120 controls the display controller 1040 to obtain (or retrieve) the wake up information from the memory device 1060. At step 214, the display controller 1040 transmits (or outputs) the wake up information to the panel device 1050 according to the Raise to Wake function. At step 216, the panel device 1050 receives the wake up information from the display controller 1040, and displays the wake up information. At step 218, the microprocessor 1120 powers off the display controller 1040 and the memory device 1060, after the panel device 1050 displays the wake up information.

It should be noted that some steps in FIG. 2 can be skipped. In one example, step 208 may be skipped, if the panel device 1050 has been powered on. In another example, the transmission operation in Step 206 is simply used to notify the memory device 1060 that the Raise to Wake function is initiated. The adjustment in step 208 and/or in step 210 may be skipped. In one example, step 218 may be skipped.

There are variations of the process 20. In one example, in step 206, the microprocessor 1120 transmits the wake up information to both the memory device 1060 and the panel device 1050. If the memory device 1060 and the panel device 1050 are powered off, the microprocessor 1120 powers on both the memory device 1060 and the panel device 1050 before transmitting the wake up information. If the memory device 1060 and the panel device 1050 are powered on, the microprocessor 1120 transmits the wake up information to the memory device 1060 and/or the panel device 1050 to notify the Raise to Wake function is initiated.

In some examples, in the process 20, the CPU 1110 is powered off and the system executed on the CPU 1110 is in a suspend mode, and the panel device 1050 is powered off. In other examples, in the process 20, the CPU 1110 is powered on.

Figure 3:
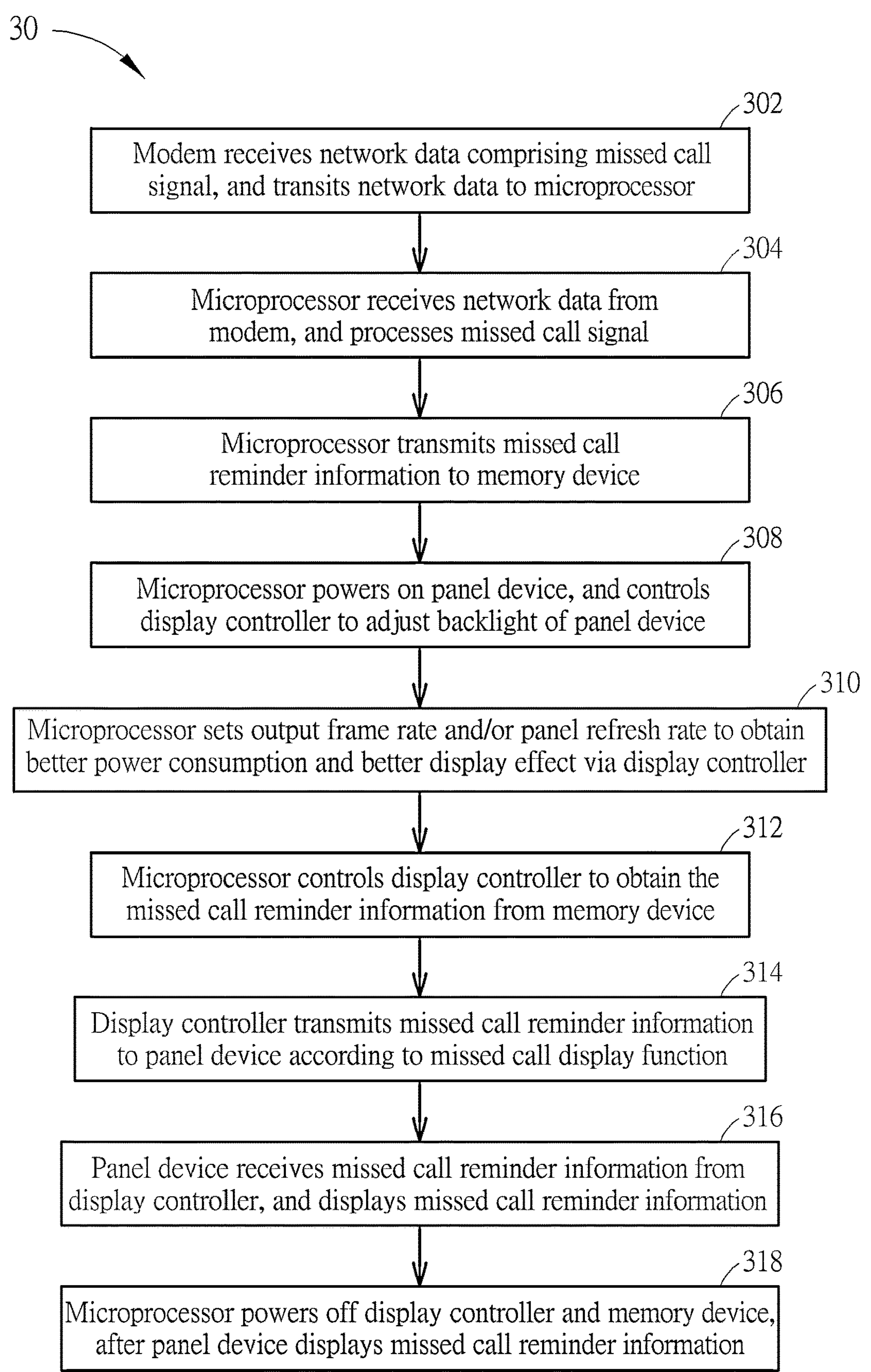
FIG. 3 is a flowchart of a process according to an example of the present disclosure.

Please refer to FIG. 3 in conjunction with FIG. 1. FIG. 3 is a flowchart of a process 30 according to an example of the present disclosure. At step 302, the modem 1000 receives network data comprising a missed call signal, and transits (or sends) the network data to the microprocessor 1120. The missed call signal indicates a missed call of the electronic device 10. At step 304, the microprocessor 1120 receives the network data from the modem 1000, and processes the missed call signal (e.g., via an EINT function). In one example, the network data or the missed call signal wakes up the microprocessor 1120, if the microprocessor 1120 is asleep (e.g., the microprocessor 1120 is powered off or in a sleep mode). Then, the microprocessor 1120 processes the network data. In one example, the microprocessor 1120 directly receives and processes the network data, if the microprocessor 1120 is awake (e.g., the microprocessor 1120 is in an active mode or in an idle mode).

At step 306, the microprocessor 1120 transmits (or outputs) missed call reminder information to the memory device 1060. In some examples, at step 306, the microprocessor 1120 powers on the memory device 1060 before transmitting (or outputting) the missed call reminder information to the memory device 1060 if the memory device 1060 is not powered on. The missed call reminder information corresponds to the missed call signal. At step 308, the microprocessor 1120 (e.g., a display driver in the microprocessor 1120) powers on the panel device 1050, and controls the display controller 1040 to adjust a backlight of the panel device 1050. At step 310, the microprocessor 1120 sets an output frame rate and/or a panel refresh rate to obtain a better power consumption and a better display effect via the display controller 1040. At step 312, the microprocessor 1120 controls the display controller 1040 to obtain (or retrieve) the missed call reminder information from the memory device 1060. At step 314, the display controller 1040 transmits (or outputs) the missed call reminder information to the panel device 1050 according to the missed call display function. At step 316, the panel device 1050 receives the missed call reminder information from the display controller 1040, and displays the missed call reminder information. At step 318, the microprocessor 1120 powers off the display controller 1040 and the memory device 1060, after the panel device 1050 displays the missed call reminder information.

It should be noted that some steps in FIG. 3 can be skipped. In one example, step 308 may be skipped, if the panel device 1050 has been powered on. In another example, the transmission operation in Step 306 is simply used to notify the memory device 1060 that the missed call display function is initiated. The adjustment in step 308 and/or in step 310 may be skipped. In one example, step 318 may be skipped.

There are variations of the process 30. In one example, in step 306, the microprocessor 1120 transmits the missed call reminder information to both the memory device 1060 and the panel device 1050. If the memory device 1060 and the panel device 1050 are powered off, the microprocessor 1120 powers on both the memory device 1060 and the panel device 1050 before transmitting the missed call reminder information. If the memory device 1060 and the panel device 1050 are powered on, the microprocessor 1120 directly transmits the missed call reminder information to the memory device 1060 and/or the panel device 1050 to notify the missed call display function is initiated.

In some examples, in the process 30, the CPU 1110 is powered off and the system executed on the CPU 1110 is in a suspend mode, and the panel device 1050 is powered off. In other examples, in the process 30, the CPU 1110 is powered on.

Figure 4:
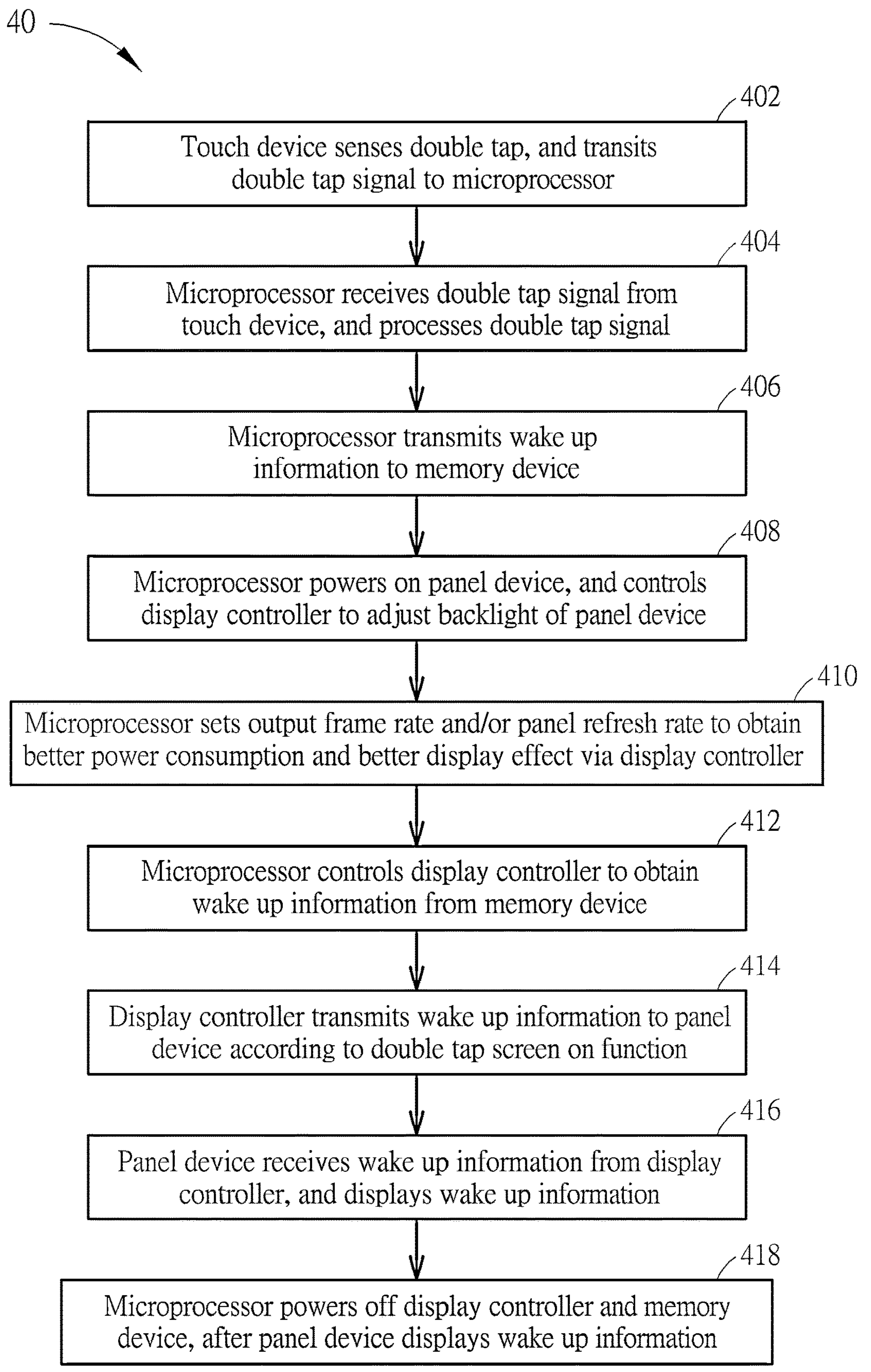
FIG. 4 is a flowchart of a process according to an example of the present disclosure.

Please refer to FIG. 4 in conjunction with FIG. 1. FIG. 4 is a flowchart of a process 40 according to an example of the present disclosure. At step 402, the touch device 1090 senses a double tap (or receives a double tap signal), and transits (or passes) the double tap signal to the microprocessor 1120. The double tap signal indicates an instruction (e.g., powered on the panel device 1050) input by a user. At step 404, the microprocessor 1120 receives the double tap signal from the touch device 1090, and processes the double tap signal (e.g., via an EINT function). In one example, the double tap signal wakes up the microprocessor 1120, if the microprocessor 1120 is asleep (e.g., the microprocessor 1120 is powered off or in a sleep mode). Then, the microprocessor 1120 processes the double tap signal. In one example, the microprocessor 1120 directly receives and processes the double tap signal, if the microprocessor 1120 is awake (e.g., the microprocessor 1120 is in an active mode or in an idle mode).

At step 406, the microprocessor 1120 transmits (or outputs) wake up information (e.g., a wake up interface) to the memory device 1060. In some examples, at step 406, the microprocessor 1120 powers on the memory device 1060 before transmitting (or outputting) the wake up information to the memory device 1060 if the memory device 1060 isn't powered on. The wake up information corresponds to the double tap signal. At step 408, the microprocessor 1120 (e.g., a display driver in the microprocessor 1120) powers on the panel device 1050, and controls the display controller 1040 to adjust a backlight of the panel device 1050. At step 410, the microprocessor 1120 sets an output frame rate and/or a panel refresh rate to obtain a better power consumption and a better display effect via the display controller 1040. At step 412, the microprocessor 1120 controls the display controller 1040 to obtain (or retrieve) the wake up information from the memory device 1060. At step 414, the display controller 1040 transmits (or outputs) the wake up information to the panel device 1050 according to the double tap screen on function. At step 416, the panel device 1050 receives the wake up information from the display controller 1040, and displays the wake up information. At step 418, the microprocessor 1120 powers off the display controller 1040 and the memory device 1060, after the panel device 1050 displays the wake up information.

It should be noted that some steps in FIG. 4 can be skipped. In one example, step 408 may be skipped, if the panel device 1050 has been powered on. In another example, the transmission operation in Step 406 is simply used to notify the memory device 1060 that the double tap screen on function is initiated. The adjustment in step 408 and/or in step 410 may be skipped. In one example, step 418 may be skipped.

There are variations of the process 40. In one example, in step 406, the microprocessor 1120 transmits the wake up information to both the memory device 1060 and the panel device 1050. If the memory device 1060 and the panel device 1050 are powered off, the microprocessor 1120 powers on both the memory device 1060 and the panel device 1050 before transmitting the wake up information. If the memory device 1060 and the panel device 1050 are powered on, the microprocessor 1120 directly transmits the wake up information to the memory device 1060 and/or the panel device 1050 to notify the double tap screen on function is initiated.

In some examples, in the process 40, the CPU 1110 is powered off and the system executed on the CPU 1110 is in a suspend mode, and the panel device 1050 is powered off. In other examples, in the process 40, the CPU 1110 is powered on.

Figure 5A:
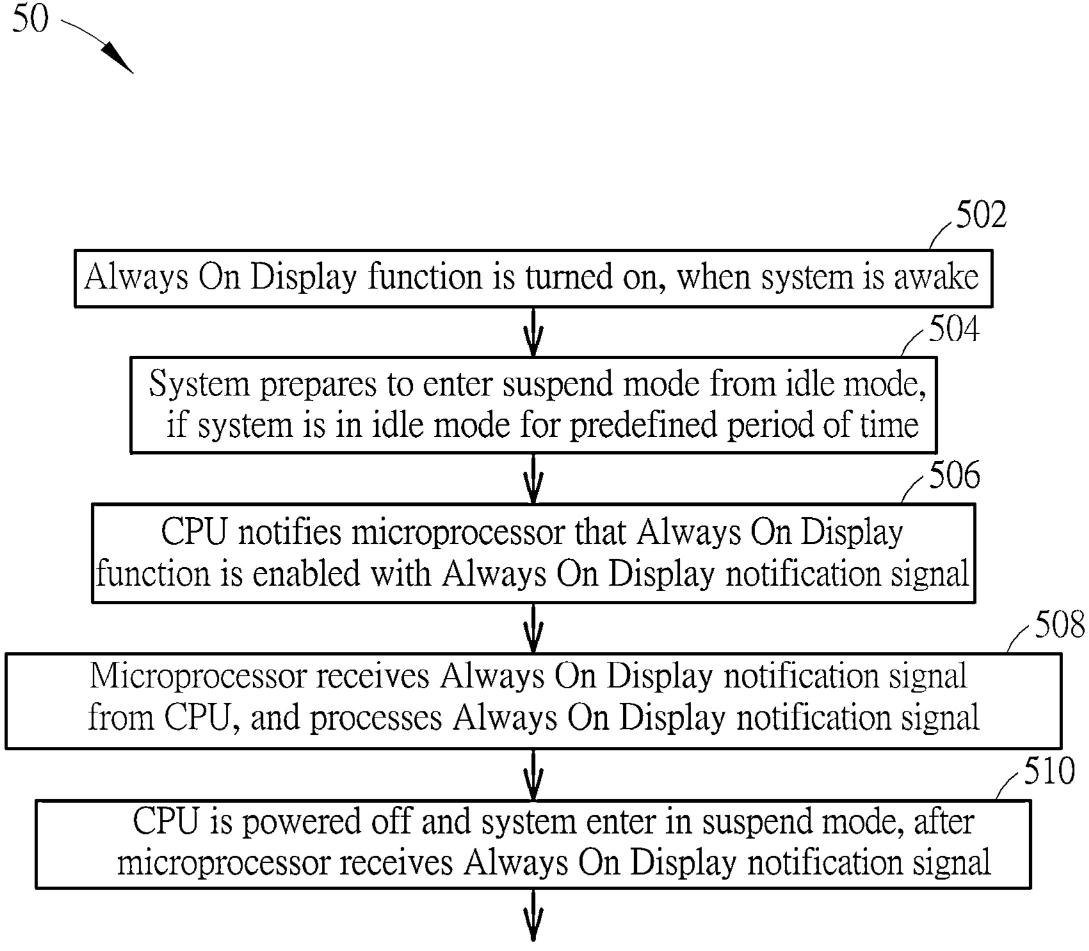
FIGS. 5A and 5B are a flowchart of a process according to an example of the present disclosure.
Figure 5B:
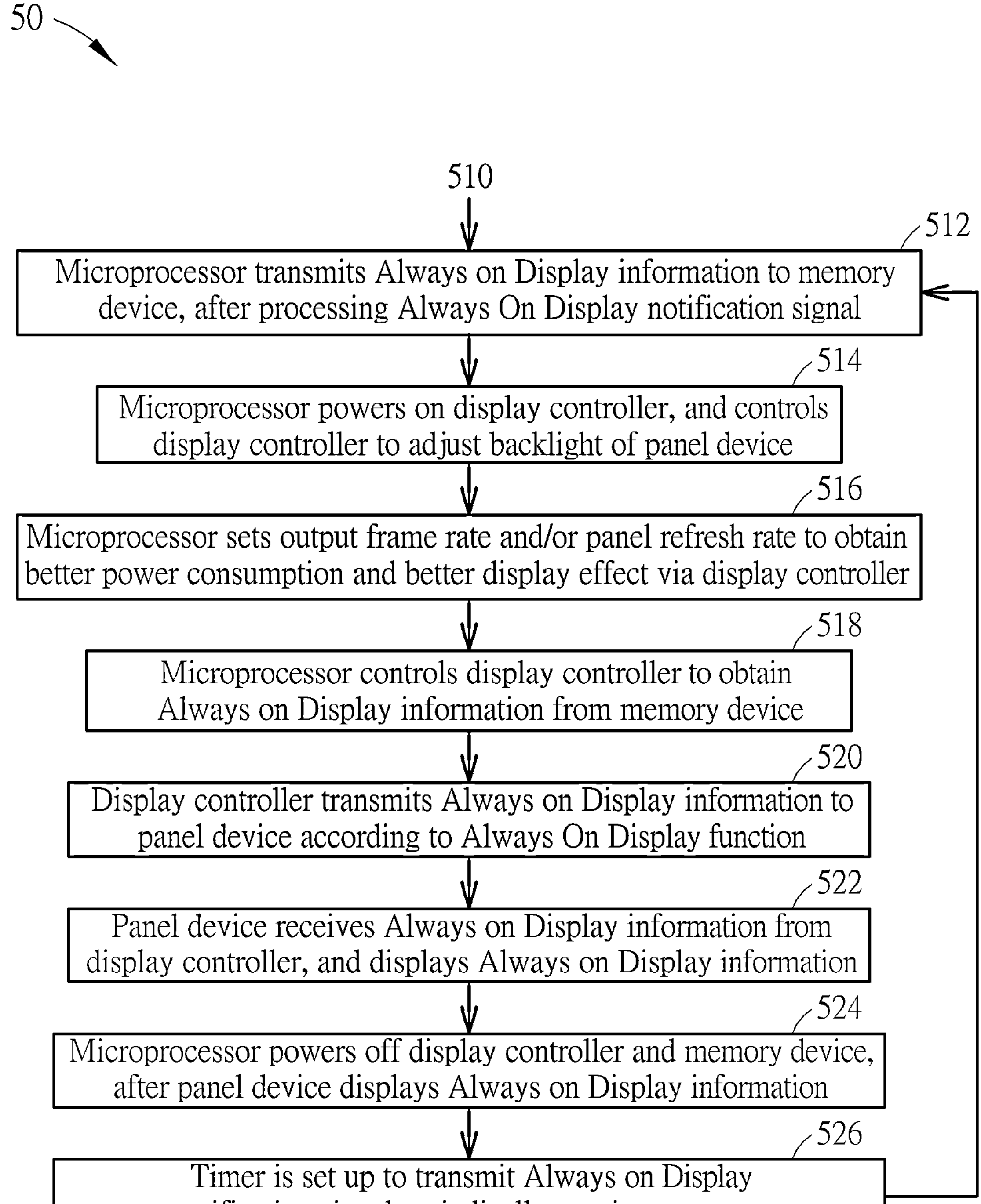

Please refer to FIGS. 5A and 5B in conjunction with FIG. 1. FIGS. 5A and 5B are a flowchart of a process 50 according to an example of the present disclosure. In the process 50, the CPU 1110 is powered on and the system executed on the CPU 1110 is in an active mode, and the panel device 1050 is powered on. At step 502, an Always On Display function is turned on (e.g., by a user), when the system is awake (e.g., in an active mode or in an idle mode). At step 504, the system prepares to enter a suspend mode from the idle mode, if the system is in the idle mode for a predefined period of time. At step 506, the CPU 1110 notifies the microprocessor 1120 that the Always On Display function is enabled with an Always On Display notification signal. That is, the Always On Display notification signal indicates that the Always On Display function is enabled. At step 508, the microprocessor 1120 receives the Always On Display notification signal from the CPU 1110, and processes the Always On Display notification signal (e.g., via an EINT function). In one example, the Always On Display notification signal wakes up the microprocessor 1120, if the microprocessor 1120 is asleep (e.g., the microprocessor 1120 is powered off or in a sleep mode). Then, the microprocessor 1120 processes the Always On Display notification signal. In one example, the microprocessor 1120 directly receives and processes the Always On Display notification signal, if the microprocessor 1120 is awake (e.g., the microprocessor 1120 is in an active mode or in an idle mode).

At step 510, the CPU 1110 is powered off and the system enter in the suspend mode, after the microprocessor 1120 receives the Always On Display notification signal. However, the panel device 1050 is not powered off, i.e., the power of the panel device 1050 is not turned off. At step 512, the microprocessor 1120 transmits Always on Display information (e.g., an Always on Display interface) to the memory device 1060, after processing the Always On Display notification signal. In some examples, at step 512, the microprocessor 1120 powers on the memory device 1060 before transmitting the Always on Display information to the memory device 1060 if the memory device 1060 is not powered on. The Always on Display information corresponds to the Always On Display notification signal. At step 514, the microprocessor 1120 (e.g., a display driver in the microprocessor 1120) powers on the display controller 1040, and controls the display controller 1040 to adjust a backlight of the panel device 1050. At step 516, the microprocessor 1120 sets an output frame rate and/or a panel refresh rate to obtain a better power consumption and a better display effect via the display controller 1040. At step 518, the microprocessor 1120 controls the display controller 1040 to obtain (or retrieve) the Always on Display information from the memory device 1060. At step 520, the display controller 1040 transmits (or outputs) the Always on Display information to the panel device 1050 according to the Always On Display function.

At step 522, the panel device 1050 receives the Always on Display information from the display controller 1040, and displays the Always on Display information. At step 524, the microprocessor 1120 powers off the display controller 1040 and the memory device 1060, after the panel device 1050 displays the Always on Display information. At step 526, a timer is set up to transmit (or send) an Always on Display notification signal periodically (e.g., every minute) to the microprocessor 1120. The method repeats the loop steps 526, 512, 514, 516, 518, 520, 522, 524 until the timer is turned off exit the Always on Display function when the system is wake up, or until the timer has transmitted (or sent) the Always on Display notification signal predetermined times. In some examples, the microprocessor 1120 can turn off the timer at anytime when needed.

It should be noted that some steps in FIGS. 5A and 5B can be skipped. In one example, step 514 may be skipped, if the panel device 1050 has been powered on. The adjustment in step 514 and/or in step 516 may be skipped. In one example, step 524 may be skipped.

There are variations of the process 50. In one example, in step 512, the microprocessor 1120 transmits the Always on Display information to both the memory device 1060 and the panel device 1050. If the memory device 1060 and the panel device 1050 are powered off, the microprocessor 1120 powers on both the memory device 1060 and the panel device 1050 before transmitting the Always on Display information. If the memory device 1060 and the panel device 1050 are powered on, the microprocessor 1120 directly transmits the Always on Display information to the memory device 1060 and/or the panel device 1050.

Figure 6:
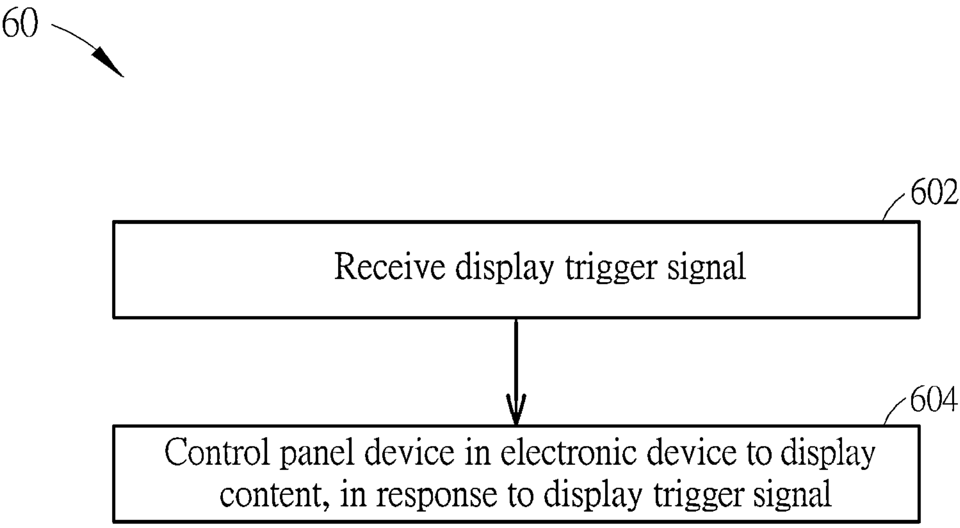
FIG. 6 is a flowchart of a process according to an example of the present disclosure.

Operations of the microprocessor 1120 in the above description can be summarized into a process 60 for the electronic device 10, as shown in FIG. 6. The process 60 includes the following steps: Step 602: Receive a display trigger signal.

Step 604: Control a panel device (e.g., the panel device 1050) in the electronic device to display a content, in response to the display trigger signal.

In some examples, in the process 60, the CPU 1110 is in a power off state (or is powered off), when the microprocessor 1120 controls the panel device 1050 to display the content. That is, in a specific scenario (e.g., Raise to Wake, Missed call display function, Double Tap Screen On or Always on Display), the microprocessor 1120 instead of the CPU 1110 controls the panel device 1050 to display the content.

Realization of the process 60 is not limited to the above description. The following examples may be applied to realize the process 60.

In one example, the CPU 1110 is powered off and the system executed on the CPU 1110 is in a suspend mode, when the panel device 1050 is powered off. In one example, the CPU 1110 is powered on and the system executed on the CPU 1110 is in an active mode, when the panel device 1050 is powered on. In one example, the CPU 1110 is in the power off state, when the microprocessor 1120 receives the display trigger signal. In one example, the CPU 1110 enters (or goes into) the power off state, after the microprocessor 1120 receives the display trigger signal.

In one example, the display trigger signal comprises (e.g., is) an angle change signal received from the sensor 1100, and the content to be displayed comprises (e.g., is) a wake up information (e.g., a wake up interface). In one example, the angle change signal indicates the angle change of the electronic device 10. In one example, the display trigger signal comprises (e.g., is) a missed call signal received from the modem 1000, and the content to be displayed comprises (e.g., is) missed call reminder information. In one example, the missed call signal indicates a missed call of the electronic device 10. In one example, the display trigger signal comprises (e.g., is) a double tap signal received from a touch device 1090, and the content to be displayed comprises (e.g., is) a wake up information (e.g., a wake up interface). In one example, the double tap signal indicates an instruction (e.g., to power on the panel device 1050) input by a user. In one example, the display trigger signal comprises (e.g., is) an Always on Display notification signal received from the CPU 1110 or from a timer, and the content to be displayed comprises (e.g., is) Always on Display information (e.g., an Always on Display interface). In one example, the Always On Display notification signal indicates that the Always On Display function is enable.

In one example, the display trigger signal is processed by the microprocessor 1120 via an EINT function. In one example, the EINT function enables interrupt after two more cycles (e.g., main clock (MCLK) cycles) beyond a current MCLK. In one example, the content to be displayed corresponds to the display trigger signal. In one example, the content to be displayed comprises at least one image or at least one picture. In one example, the display trigger signal wakes up the microprocessor 1120, if the microprocessor 1120 is asleep. Then, the microprocessor 1120 processes the display trigger signal. In one example, the microprocessor 1120 directly receives and processes the display trigger signal, if the microprocessor 1120 is awake.

In one example, the microprocessor 1120 controls a display controller 1040 to adjust a backlight of the panel device 1050, when the microprocessor 1120 controls the panel device 1050 to display the content. In one example, the microprocessor 1120 sets an output frame rate and a panel refresh rate via the display controller 1040, when the microprocessor 1120 controls the panel device 1050 to display the content. In one example, the output frame rate is a rate (or a frequency) at which consecutive images (or consecutive frames) are captured or displayed. In one example, the panel refresh rate is a rate (e.g., the number of times per second) at which the image refreshes on a screen in electronic device 10. In one example, the microprocessor 1120 is a low-power microprocessor (e.g., a MIPS, a RISC or a DSP). In one example, the microprocessor 1120 and the CPU 1110 are in the same SOC.

In one example, the step of the microprocessor 1120 to control the panel device 1050 to display the content comprises: the microprocessor 1120 transmits the content to the memory device 1060; the microprocessor 1120 controls the display controller 1040 to obtain the content from the memory device 1060, and transmits the content to the panel device 1050 according to the function; the panel device 1050 receives the content from the display controller 1040, and displays the content; and the microprocessor 1120 powers off the display controller 1040 and the memory device 1060, after the panel device 1050 displays the content.

In one example, the step of the microprocessor 1120 to control the panel device 1050 to display the content comprises: the microprocessor 1120 transmits the content to the memory device 1060; the microprocessor 1120 powers on the display controller 1040, and controls the display controller 1040 to obtain the content from the memory device 1060; the display controller 1040 transmits the Always on Display information to the panel device 1050 according to a function; the panel device 1050 receives the content from the display controller 1040, and displays the content; and the microprocessor 1120 powers off the display controller 1040 and the memory device 1060, after the panel device 1050 displays the content.

To sum up, examples of the present disclosure provide a method and an electronic device for handling a display control. In a specific scenario, the microprocessor instead of the CPU and the system executed on the CPU controls the panel device to display the content. The CPU is powered off and the system is in the suspend mode, when the microprocessor controls the panel device. Thus, the power consumption can be improved.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method for handling a display control of a microprocessor in an electronic device, comprising:

receiving, by the microprocessor, a display trigger signal; and controlling, by the microprocessor, a panel device in the electronic device to display a content, in response to the display trigger signal;

wherein the display trigger signal comprises an angle change signal received from a sensor in the electronic device, and the content to be displayed comprises a wake up information;

wherein a central processing unit (CPU) in the electronic device is in a power off state, when controlling the panel device to display the content;

wherein the CPU is a core processor responsible for controlling and executing operations of the electronic device, and the microprocessor is a low-power microprocessor and arranged to assists the CPU.

2. The method of claim 1, wherein the CPU is in the power off state, when receiving the display trigger signal; or the CPU enters the power off state, after receiving the display trigger signal.

3. The method of claim 1, wherein the display trigger signal comprises a missed call signal received from a modem in the electronic device, and the content to be displayed comprises missed call reminder information.

4. The method of claim 1, wherein the display trigger signal comprises a double tap signal received from a touch device in the electronic device, and the content to be displayed comprises a wake up information.

5. The method of claim 1, wherein the display trigger signal comprises an Always on Display notification signal received from a CPU in the electronic device or from a timer, and the content to be displayed comprises Always on Display information.

6. The method of claim 1, further comprising:

controlling a display controller in the electronic device to adjust a backlight of the panel device, when controlling the panel device to display the content.

7. The method of claim 1, further comprising:

setting an output frame rate and a panel refresh rate via a display controller in the electronic device, when controlling the panel device to display the content.

8. The method of claim 1, wherein the microprocessor and the CPU in the electronic device are in the same system on chip (SOC).

9. An electronic device for handling a display control, comprising:

a central processing unit (CPU);

a panel device; and a microprocessor, arranged to receive a display trigger signal; and control the panel device to display a content, in response to the display trigger signal;

wherein the display trigger signal comprises an angle change signal received from a sensor in the electronic device, and the content to be displayed comprises a wake up information;

wherein the CPU is in a power off state, when the microprocessor controls the panel device to display the content;

wherein the CPU is a core processor responsible for controlling and executing operations of the electronic device, and the microprocessor is a low-power microprocessor and arranged to assists the CPU.

10. The electronic device of claim 9, wherein the CPU is in the power off state, when the microprocessor receives the display trigger signal; or the CPU enters the power off state, after the microprocessor receives the display trigger signal.

11. The electronic device of claim 9, wherein the display trigger signal comprises a missed call signal received from a modem in the electronic device, and the content to be displayed comprises missed call reminder information.

12. The electronic device of claim 9, wherein the display trigger signal comprises a double tap signal received from a touch device in the electronic device, and the content to be displayed comprises a wake up information.

13. The electronic device of claim 9, wherein the display trigger signal comprises an Always on Display notification signal received from the CPU or from a timer, and the content to be displayed comprises Always on Display information.

14. The electronic device of claim 9, wherein the microprocessor is further arranged to control a display controller in the electronic device to adjust a backlight of the panel device, when controlling the panel device to display the content.

15. The electronic device of claim 9, wherein the microprocessor is further arranged to set an output frame rate and a panel refresh rate via a display controller in the electronic device, when controlling the panel device to display the content.

16. The electronic device of claim 9, wherein the microprocessor and the CPU are in the same system on chip (SOC).

* * * * *